United States Patent
Gupta

(10) Patent No.: US 10,243,900 B2
(45) Date of Patent: Mar. 26, 2019

(54) USING PRIVATE TOKENS IN ELECTRONIC MESSAGES ASSOCIATED WITH A SUBSCRIPTION-BASED MESSAGING SERVICE

(71) Applicants: LONGSAND LIMITED, Cambridge (GB); Saurabh Gupta, Bangalore (IN)

(72) Inventor: Saurabh Gupta, Bangalore (IN)

(73) Assignee: LONGSAND LIMITED, Cambridge (GB)

( * ) Notice: Subject to any disclaimer, the term of this patent is extended or adjusted under 35 U.S.C. 154(b) by 317 days.

(21) Appl. No.: 14/906,795

(22) PCT Filed: Aug. 21, 2013

(86) PCT No.: PCT/IN2013/000505
§ 371 (c)(1),
(2) Date: Jan. 21, 2016

(87) PCT Pub. No.: WO2015/025325
PCT Pub. Date: Feb. 26, 2015

(65) Prior Publication Data
US 2016/0182418 A1 Jun. 23, 2016

(51) Int. Cl.
*G06F 15/16* (2006.01)
*H04L 12/58* (2006.01)
(Continued)

(52) U.S. Cl.
CPC .............. *H04L 51/08* (2013.01); *H04L 51/10* (2013.01); *H04L 51/12* (2013.01); *H04L 63/08* (2013.01); *H04L 12/1859* (2013.01)

(58) Field of Classification Search
CPC ..... H04L 12/1859; H04L 51/08; H04L 51/10; H04L 63/08
See application file for complete search history.

(56) References Cited

U.S. PATENT DOCUMENTS

| 6,968,364 B1* | 11/2005 | Wong | H04N 5/765 348/E7.071 |
| 7,290,035 B2 | 10/2007 | Mattathil | |

(Continued)

FOREIGN PATENT DOCUMENTS

| CN | 1434390 | 8/2003 |
| CN | 1705939 | 12/2005 |

(Continued)

OTHER PUBLICATIONS

Basavaraju, M. et al.; "A Novel Method of Spam Mail Detection Using Text Based Clustering Approach"; Aug. 2010; vol. 5; Issue: 4; 11 pages.

(Continued)

*Primary Examiner* — Mohamed A Wasel

(57) ABSTRACT

Systems and methods associated with subscription-based electronic messaging are described. A method includes obtaining registration information associated with a user who has subscribed to receive electronic messages from a subscription-based messaging service. The registration information includes an electronic address of the user and a private token that is known to the user and to the subscription-based messaging service. The method includes embedding the private token in an electronic message associated with the subscription-based messaging service, and such inclusion of the private token may indicate to the user that the electronic message is from a legitimate sender associated with the subscription-based messaging service. The method also includes sending the electronic message to the electronic address of the user.

14 Claims, 4 Drawing Sheets

(51) Int. Cl.
  *H04L 29/06* (2006.01)
  *H04L 12/18* (2006.01)

(56) References Cited

U.S. PATENT DOCUMENTS

| | | | |
|---|---|---|---|
| 7,363,490 B2* | 4/2008 | Paulsen, Jr. | G06Q 10/107 713/154 |
| 7,774,719 B2 | 8/2010 | Taylor | |
| 7,917,943 B1* | 3/2011 | Dreymann | G06Q 10/00 709/206 |
| 8,347,095 B2 | 1/2013 | Cunningham et al. | |
| 8,429,411 B2* | 4/2013 | Adams | G06Q 10/107 713/176 |
| 8,583,149 B2* | 11/2013 | Vyrros | H04L 51/28 455/466 |
| 8,793,491 B2* | 7/2014 | Dancer | H04L 63/0442 380/277 |
| 9,197,591 B2* | 11/2015 | Singer | H04L 51/04 |
| 9,792,600 B1 | 10/2017 | Grassadonia | G06Q 20/227 |
| 9,843,447 B1* | 12/2017 | Bishop | H04L 63/1466 |
| 2004/0145773 A1 | 7/2004 | Oakeson | |
| 2005/0267994 A1* | 12/2005 | Wong | H04N 5/765 709/246 |
| 2006/0026107 A1* | 2/2006 | Urro | G06O 20/367 705/65 |
| 2006/0031318 A1* | 2/2006 | Gellens | G06Q 10/107 709/206 |
| 2006/0159096 A1 | 7/2006 | Gershinsky | |
| 2006/0218232 A1* | 9/2006 | Kubala | G06Q 10/107 709/206 |
| 2006/0277597 A1* | 12/2006 | Dreymann | G06Q 10/107 726/4 |
| 2008/0201578 A1* | 8/2008 | Drake | G06F 21/34 713/172 |
| 2009/0106840 A1* | 4/2009 | Dreymann | G06F 21/56 726/23 |
| 2009/0210713 A1* | 8/2009 | Ourega | H04L 63/123 713/176 |
| 2010/0070419 A1* | 3/2010 | Vadhri | G06Q 10/107 705/71 |
| 2011/0173681 A1 | 7/2011 | Qureshi | |
| 2011/0202620 A1 | 8/2011 | Wang | |
| 2011/0258065 A1* | 10/2011 | Fordyce, III | G06Q 10/10 705/26.1 |
| 2013/0332544 A1* | 12/2013 | Brian | H04L 51/04 709/206 |
| 2013/0340043 A1* | 12/2013 | Zarei | G06F 21/31 726/4 |
| 2014/0258433 A1* | 9/2014 | Clark | H04L 51/12 709/206 |
| 2014/0259135 A1* | 9/2014 | Postrel | H04L 63/0807 726/7 |
| 2016/0119377 A1* | 4/2016 | Goldberg | G06F 17/27 726/12 |
| 2017/0085584 A1* | 3/2017 | Goutal | H04L 63/1483 |
| 2018/0109383 A1* | 4/2018 | Bishop | H04L 63/1466 |

FOREIGN PATENT DOCUMENTS

| | | |
|---|---|---|
| CN | 101273344 | 9/2008 |
| CN | 103001977 | 3/2013 |
| GB | 2463532 | 3/2010 |
| WO | WO-2006051434 | 5/2006 |
| WO | WO-2011047571 | 4/2011 |

OTHER PUBLICATIONS

State Intellectual Property Office of the P.R. China (ISA/CN), International Search Report and Written Opinion for International Application No. PCT/IN2013/000505 dated May 23, 2014 (12 pages).

\* cited by examiner

USING PRIVATE TOKENS IN ELECTRONIC MESSAGES ASSOCIATED WITH A SUBSCRIPTION-BASED MESSAGING SERVICE

BACKGROUND

Many users of electronic messaging systems such as email, text, and other similar electronic communications systems have a love/hate relationship with the technology. On one hand, electronic messaging allows people to communicate and interact with other people almost anywhere in the world, and in a timeframe that is convenient for both the senders and the receivers of such messages. On the other hand, abuses of electronic messaging may cause user frustration, particularly on the part of receivers of unsolicited and/or illegitimate messages.

DETAILED DESCRIPTION

Figure 1:
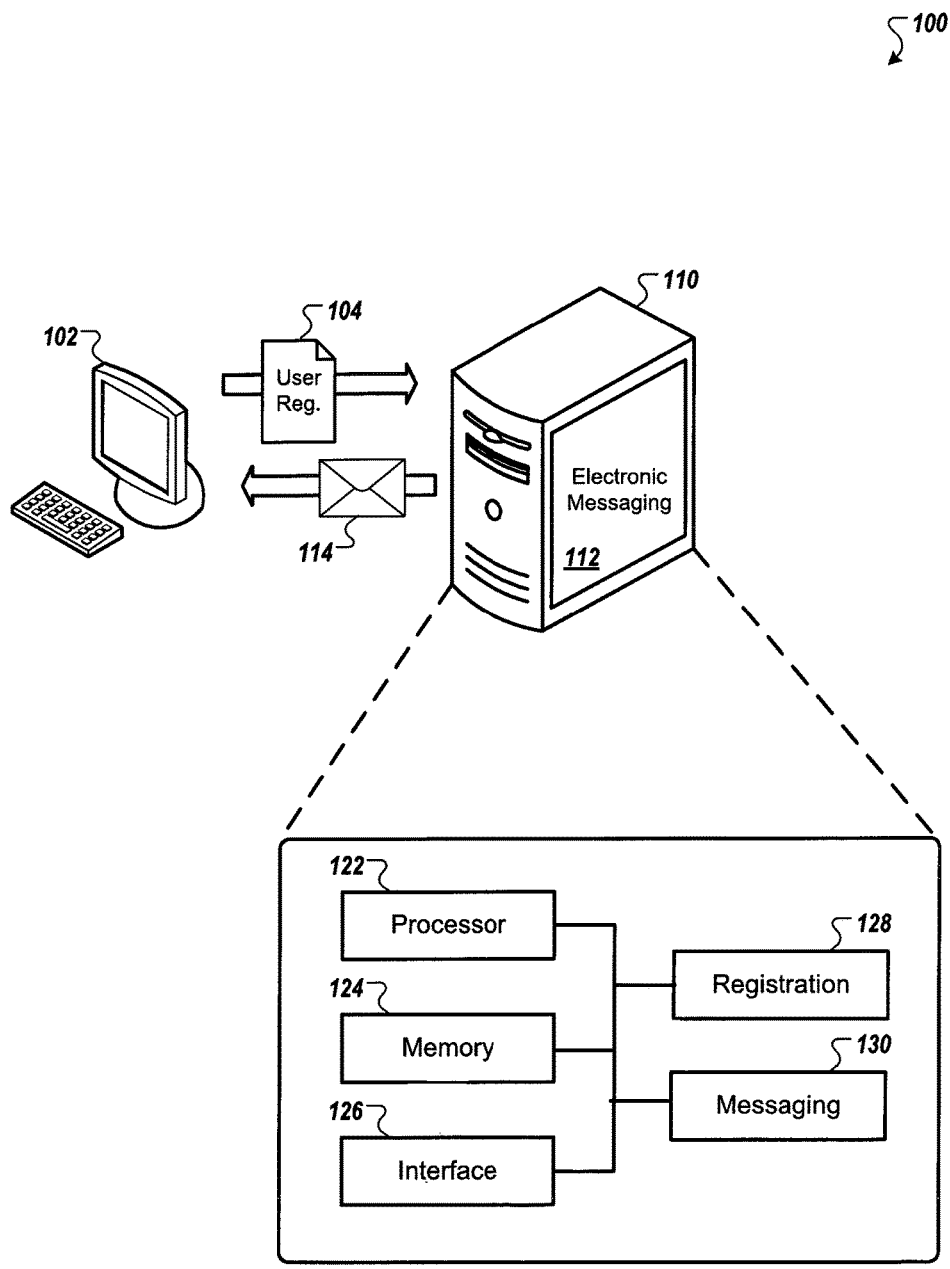
FIG. 1 is a conceptual diagram of an example electronic messaging environment in accordance with implementations described herein.

One example of electronic messaging abuse is often referred to as spam. In general, spamming is the use of electronic messaging systems to indiscriminately distribute unsolicited electronic messages to large numbers of users. Because spamming may be performed relatively anonymously and may in some cases be very profitable, the practice continues to expand and represents a serious problem for the usability of electronic messaging in general. Spam messages may come in a variety of different forms including, for example, unsolicited advertising of products and/or services, job offers, and adult content, among others. These unsolicited messages are, at a minimum, a nuisance to users, but the messages may also be harmful or offensive—particularly spam that includes adult content or other offensive materials or content.

Another example of electronic messaging abuse is often referred to as phishing. Phishing schemes may be used to steal user information (e.g., usernames, passwords, credit cards, etc.) by impersonating a trustworthy entity in an electronic message. For example, phishers may use legitimate entity names, logos, and other information in electronic messages sent to a user, but the messages may embed links that lead unwitting users to a malicious website rather than to the legitimate entity's website. The malicious website may incorporate a similar look and feel as the legitimate entity's website, and may thereby attempt to trick users into providing their financial or other confidential information.

To reduce the number of spam, phishing, and other types of illegitimate messages being directed to a recipient's attention (e.g., delivered in the recipient's inbox), filters have typically been used to detect illegitimate messages, and to process the messages appropriately. For example, messages that are believed to be illegitimate may be deleted or routed to a special folder (e.g., a spam folder, a junk folder, a phishing folder, or other similar folder) so that users may determine for themselves, and at a time that is convenient, whether such messages are legitimate or illegitimate. As used herein, electronic messages from spammers, phishers, or the like may be referred to as illegitimate, abusive, or deceptive messages to distinguish them from legitimate, non-abusive, standard electronic messages, e.g., from known users.

Electronic message filters may be applied at a messaging server, at a messaging client, or both, and may utilize a number of techniques to distinguish between legitimate messages and illegitimate messages. Such filtering techniques may include, for example, keyword or character string recognition, concept identification, rule-based filtering, source/identity analysis, and/or other appropriate techniques or combinations of such techniques. However, spammers and phishers are constantly developing new approaches to bypass anti-spam and/or anti-phishing filters, often at a rate that exceeds the creation of the new filters. Furthermore, simply applying more filtering is not always beneficial, as many filtering approaches may provide false positives that cause legitimate, desired messages to be filtered (and therefore deleted or otherwise removed from a user's inbox) along with the illegitimate messages.

Described herein are techniques for identifying legitimate messages in a manner that may allow a receiving user to quickly and conclusively determine whether a received message is in fact legitimate and from a sender that the user approves. As an example, when a user registers for a subscription-based messaging service, the user may be associated with a private token that is known to the user and to the messaging service. The private token may include, for example, a textual word, a textual phrase, an image, an audible sound, combinations of the foregoing, or other appropriate tokens. When the messaging service sends an electronic message to the user, the service may embed the private token in the message, and the inclusion of the private token in the message may indicate to the user that the electronic message is from a legitimate sender. The user may then process the received electronic message accordingly—e.g., by visually inspecting the message to determine if the private token is present, or by setting up filters in a messaging client to perform such inspection. In some implementations, the techniques may work in conjunction with existing and/or future messaging filters to provide improvements in the usability of electronic messaging.

FIG. 1 is a conceptual diagram of an example electronic messaging environment 100 in accordance with implementations described herein. As shown, environment 100 includes a computing system 110 that is configured to execute an electronic messaging engine 112. The electronic messaging engine 112 may generally operate to provide registration services and messaging services in accordance with the techniques described herein. As used herein, the term electronic messaging should be understood to describe various forms of electronic communications, including, for example, email, text, and other appropriate forms of communications. Similarly, the terms electronic messaging service and electronic messaging system should be considered broadly applicable to various forms of messaging distribution systems or services, including, for example, email or text-based news feeds, electronic notification or update messages from user-subscribed blogs or social networking sites, subscription-based email distribution groups, and other appropriate communications channels that may provide user registration.

The example topology of environment 100 may be representative of various electronic messaging environments. However, it should be understood that the example topology of environment 100 is shown for illustrative purposes only, and that various modifications may be made to the configuration. For example, environment 100 may include different or additional components, or the components may be implemented in a different manner than is shown. In some implementations, the registration services and messaging services of electronic messaging engine 112 may be performed and/or hosted by different computing devices, and such services may be provided in a consolidated or a distributed manner. Also, while computing system 110 is generally illustrated as a standalone server, it should be understood that computing system 110 may, in practice, be any appropriate type of computing device, such as a server, a mainframe, a laptop, a desktop, a workstation, or other device. Computing system 110 may also represent a group of computing devices, such as a server farm, a server cluster, or other group of computing devices operating individually or together to perform the functionality described herein.

In operation, the functionality of electronic messaging engine 112 may be described in two phases—a registration phase, and a messaging phase. During the registration phase, a user of a computing device 102 may communicate with the electronic messaging engine 112 (e.g., via the Internet, a network, or any other appropriate communication channel) to provide user registration information 104. During the messaging phase, the electronic messaging engine 112 may distribute electronic messages 114 to the user based on the user registration information 104.

For example, the user may register with the electronic messaging service by providing user registration information 104, which may include the user's electronic address and other communication preferences, such that the electronic messaging engine 112 knows what content the user wishes to receive, and where to deliver such content. Based on the user registration information 104, the electronic messaging engine 112 may send electronic messages to the user on a periodic basis (e.g., once a day), on a scheduled basis (e.g., at a time specified by the user), or in an ad hoc manner (e.g., whenever a message is ready to be sent). After receiving the electronic messages 114, the user may access the electronic messages 114, e.g., using the computing device 102 or any other appropriate device that is configured to receive such messages. For example, the user may have multiple messaging clients operating on separate computing devices (e.g., a home computer, a work computer, a smartphone, a tablet, or the like) for accessing such electronic messages. Similarly, the user may use one or more web-based messaging clients to access received electronic messages from any appropriate web browser.

In an ideal world, the user might be able to trust that all received electronic messages are the types of messages that the user wishes to receive, and that the messages are from legitimate senders. However, the ideal world scenario does not describe electronic messaging in the real world. Instead, in the real world, spammers, phishers, and other illegitimate senders may inundate the user with unsolicited and/or illegitimate electronic messages that are intended to induce some action from the user—e.g., to purchase products or services being offered in spam messages, or to trick the user into providing confidential or financial, information using phishing techniques. As described above, traditional filtering techniques may result in either over-inclusive or under-inclusive filtering of such illegitimate messages.

According to the techniques described herein, a private token that is shared between the user and a messaging service may be used to indicate that electronic messages including the token are indeed from a legitimate sender. The private token may include a textual word, an image, or a combination of a textual word and an image. The private token may also take other appropriate forms. The private token may be generated, e.g., by the user or by the messaging service, during an initial registration or during subsequent updates of the user's registration information as described in greater detail below.

It should be understood that the user may subscribe to multiple different messaging services, and that the user may use the same, similar, or different tokens for each, of the respective services. In some cases, it may be beneficial for the user to select different tokens for different messaging services—e.g., to ensure that the user's other tokens are not compromised if one is compromised, and also to allow for the sorting of received messages based on the different embedded tokens.

Following registration, the electronic messaging engine 112 may embed the private token in any electronic messages subsequently sent to the user. The private token may indicate (either visually or otherwise) that the messages are from a legitimate sender.

In some implementations, the private token may be embedded in the electronic message such that the private token is visible to the user, e.g., within a body portion or a subject portion of the electronic message. In such cases, the token may be displayed in a prominent location of the message so that the user may readily identify whether the token is included or not, and the user may be able to quickly inspect the message to determine whether it is legitimate based on the inclusion (or exclusion) of the private token. The user may also set up specific filters (e.g., in one or more messaging clients) to process incoming electronic messages based on the inclusion or exclusion of the private token.

In other implementations, the private token may be embedded in the electronic message such that the private token is not visible to the user in a body portion or a subject portion of the electronic message. For example, the token may instead be embedded in hidden fields that are not generally visible to the user, such as in a message header or other appropriate location. In general, such hidden fields may be accessible by a savvy user, but may not be included in the normally-visible portions of the message and may require additional effort by the user to access the appropriate field. In implementations where the private token is generally not visible, specific user filters (e.g., created for one or more messaging clients) may be used to process the incoming electronic messages based on the inclusion or exclusion of the private token.

Computing system 110 may be configured to execute the electronic messaging engine 112, and may include a processor 122, a memory 124, an interface 126, a registration engine 128, and a messaging engine 130. It should be understood that the components shown are for illustrative purposes only, and that in some cases, the functionality, being described with respect to a particular module or component of computing system 110 may be performed by one or more different or additional modules or components, e.g., of computing system 110 or of another appropriate computing system. Similarly, it should be understood that portions or all of the functionality may be combined into fewer modules or components than are shown.

Processor 122 may be configured to process instructions for execution by computing system 110. The instructions may be stored on, a non-transitory, tangible computer-readable storage medium, such as in memory 124 or on a separate storage device (not shown), or on any other type of volatile or non-volatile memory that stores instructions to cause a programmable processor to perform the techniques described herein. Alternatively or additionally, computing system 110 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

Interface 126 may be implemented in hardware and/or software, and may be configured, for example, to receive user registration information from any number of different users of the service, and to send messages to the various users according to their preferences. For example, interface 126 may be configured to send email messages to users according to the Simple Mail Transfer Protocol (SMTP) or other appropriate email transfer protocols. Similarly, interface 126 may be configured to send text messages via Short Message Service (SMS) or other appropriate text distribution protocols. Other electronic message types and/or protocols may also be used by interface 126 to distributed messages to users of the electronic messaging service.

In some implementations, interface 126 may be configured to locate and/or request messaging content from one or more external content sources (not shown). For example, rather than selecting or generating the messaging content directly, the electronic messaging engine 112 may serve as a message authentication and distribution server, and may embed private tokens into messages that have been authenticated as coming from a legitimate sender even if the electronic messaging engine 112 is not the ultimate source of the message. In such implementations, users may indicate that they are interested in receiving messages from affiliated entities and/or third party partners of the messaging service, and the messaging service may embed the appropriate private token to ensure that the user can verify the legitimacy of the received message. Similarly, the electronic messaging engine 112 may serve as an electronic messaging clearinghouse for distribution of messages from a number of different sources that the user has registered to receive.

Registration engine 128 may execute on one or more processors, e.g., processor 122, and may solicit, receive, and store registration information associated with users of the electronic messaging service. During registration, the registration engine 128 may guide the various users through the registration process and may collect relevant registration information associated with each of the users. Examples of registration information may include the user's name, electronic address (e.g., email address, mobile telephone number, or other electronic address associated with the user), and any other relevant contact information associated with the user. Other examples of registration information may include the user's communication preferences, such as messaging frequency and/or schedule, desired messaging content, and other appropriate preferences.

In addition to the registration information described above, the registration engine 128 may also store a private token associated with the user. In some implementations, the private token may be selected by the user during registration. In such cases, the registration engine 128 may analyze the private token to determine whether it is likely to occur (e.g., naturally or by chance) in electronic messages that are distributed by the electronic messaging service. For example, if the electronic messaging service typically distributes gardening newsletters to its subscribers, then a user-selected private token of the term "fertilizer" or "water" may not be useful to distinguish the electronic message as legitimate or illegitimate.

To determine whether the private token is likely to occur in "normal" use cases, the registration engine 128 may compare the private token to an index of terms associated with messages from the messaging service. Such indexes may be generated based on the general topical content of messages distributed from the particular messaging service, and may include terms from other similarly related topics. In other implementations, the registration engine 128 may compare the selected private token to terms that had been included in prior electronic messages sent from the messaging service. In yet other implementations, combinations of such approaches may be used to ensure that the user does not select a token that is likely to be included in messages sent from the service. If the registration engine 128 determines that such overlap is likely to occur, the engine may notify the user and suggest that the user select a different private token.

In some implementations, registration engine 128 may generate the private token rather than allowing the user to select a private token, and the registration engine 128 may communicate the generated private token to the user during registration. For example, the registration engine 128 may display the generated private token via a user interface, and may also display instructions for how the private token will be used in legitimate electronic messages.

Following the registration phase, and during normal operation, the registration engine 128 may be configured to obtain the registration information associated with individual users before messages to those users are distributed. For example, messaging engine 130 may query registration engine 128 to request the private tokens and electronic addresses for each of the respective users to whom the messages are to be sent.

Messaging engine 130 may execute on one or more processors, e.g., processor 122, and may generate electronic messages to be sent the electronic addresses of the respective users who have subscribed to receive such messages. The content of the electronic messages may be generated or provided from any appropriate content source, including editors, administrators, or other content generators associated with the messaging system, or from external content generators, or from other appropriate sources. The messaging engine 130 may embed or otherwise include the private token in the electronic message (e.g., separate from the content of the electronic message, or disposed among the content of the electronic message) to indicate that the message is legitimate.

Messaging engine 130 may include the private token in the electronic message in a manner such that it is readily visible to the user (e.g., within a body portion or a subject portion of the electronic message), or in a manner such that it is not readily visible to the user (e.g., within a hidden field such as the message header or other appropriate non-visible portion of the message). In either case, the messaging engine 130 may then send the electronic message, including the user-requested content and the private token (whether visible or hidden), to the electronic address associated with the user.

Figure 2:
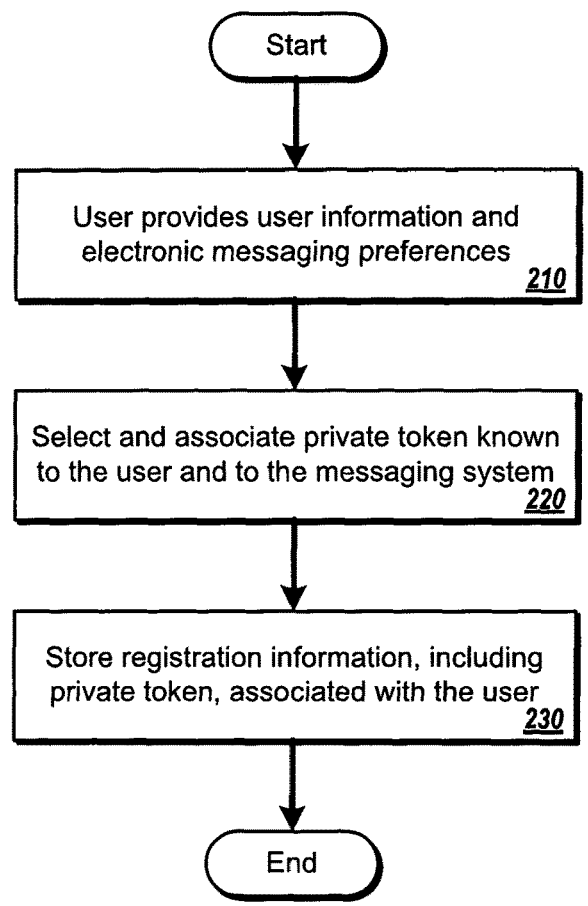
FIG. 2 is a flow diagram of an example registration process in accordance with implementations described herein.

FIG. 2 is a flow diagram of an example registration process 200 in accordance with implementations described herein. The process 200 may be performed, for example, by a registration module of an electronic messaging service, such as the registration engine 128 illustrated in FIG. 1. For clarity of presentation, the description that follows uses the registration engine 128 illustrated in FIG. 1 as the basis of an example for describing the process. However, it should be understood that another system, or combination of systems, may be used to perform the process or various portions of the process.

Process 200 begins at block 210 when a user provides user information and any electronic messaging preferences to the electronic messaging service. The registration process may be performed, for example, by the user entering such information on a website associated with the electronic messaging service. Collectively, the information that the user provides during the registration process or in subsequent updates of such information may be referred to as registration information.

At block 220, a private token is selected and associated with the user. The private token is known to the user and to the messaging system, and for greatest efficacy, should be kept unknown to others. The private token may be user-generated or system-generated, depending on the implementation.

In cases where the private token is user-generated, the private token may be analyzed, e.g., by, registration engine 128, to determine whether the private token is likely to occur in electronic messages from the messaging system. For example, the registration engine 128 may compare the user-generated private token to an index of terms associated with messages from the messaging system, or to terms included in prior electronic messages sent from the messaging system. If the comparison indicates a match, then the private token may be determined to be likely to occur in subsequent messages as well. If it is determined that the private token is likely to occur in messages from the system, the system may notify the user during registration, and may suggest or require that the user choose a different private token.

In cases where the private token is system-generated, the private token may be communicated to the user during registration, e.g., by displaying the private token on a user interface, or by sending the private token in a message directed to the user, or in another appropriate manner. The system may utilize similar procedures as described above to ensure that an appropriate private token is chosen—e.g., one that is unlikely to occur in messages from the system.

At block 230, the registration information, including the private token, may be stored in association with the user. For example, in some implementations, registration engine 128 may store a user record in a database for each user who registers to receive electronic messages from the system. The user record may be stored for later access or updating, as appropriate.

Figure 3:
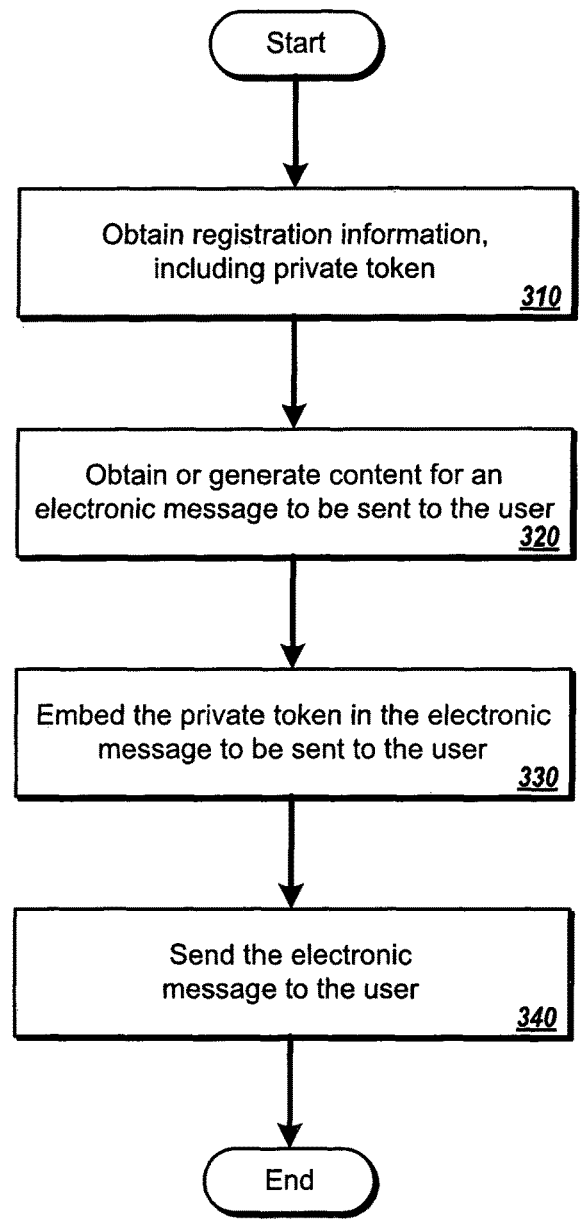
FIG. 3 is a flow diagram of an example electronic messaging process in accordance with implementations described herein.

FIG. 3 is a flow diagram of an example electronic messaging process 300 in accordance with implementations described herein. The process 300 may be performed, for example, by a messaging module of an electronic messaging service, such as the messaging engine 130 illustrated in FIG. 1. For clarity of presentation, the description that follows uses the messaging engine 130 illustrated in FIG. 1 as the basis of an example for describing the process. However, it should be understood that another system, or combination of systems, may be used to perform the process or various portions of the process.

Process 300 begins at block 310 when registration information, including the private token, is obtained. The registration information may also include one or more electronic addresses associated with a user to whom the electronic message is to be sent.

At block 320, content for an electronic message to be sent to a user is either obtained or generated. For example, the messaging engine 130 may be used to generate the content directly (e.g., as input by one or more editors, administrators, or other authorized content generators). As another example, the messaging engine 130 may obtain content for the electronic messages from external content generators or other appropriate sources.

At block 330, the private token is embedded in the electronic message to be sent to the user. The private token may, in various implementations, be embedded amongst the content of the electronic message or separated from the content of the electronic message. In some implementations, the private token may be embedded in the electronic message such that the private token is visible to the user, e.g., within a body portion or a subject portion of the electronic message. In such cases, the token may be displayed in a prominent location of the message so that the user may readily identify whether the token is included or not, and the user may be able to quickly inspect the message to determine whether it is legitimate based on the inclusion (or exclusion) of the private token. The user may also set up specific filters (e.g., in one or more messaging clients) to process incoming electronic messages based on the inclusion or exclusion of the private token.

In other implementations, the private token may be embedded in the electronic message such that the private token is not visible to the user in a body portion or a subject portion of the electronic message. For example, the token may instead be embedded in hidden fields that are not generally visible to the user, such as in a message header or other appropriate location. In general, such hidden fields may be accessible by a savvy user, but may not be included in the normally-visible portions of the message and may require additional effort by the user to access the appropriate field. In implementations where the private token is generally not visible, specific user filters (e.g., created for one or more messaging clients) may be used to process the incoming electronic messages based on the inclusion or exclusion of the private token.

At block 340, the electronic message, including the private token, is sent to the user. As described above, the user may either visually inspect the electronic message to verify its legitimacy (e.g., when the message includes the private token), or may set up a client-side filter to inspect the electronic message, or both.

Figure 4:
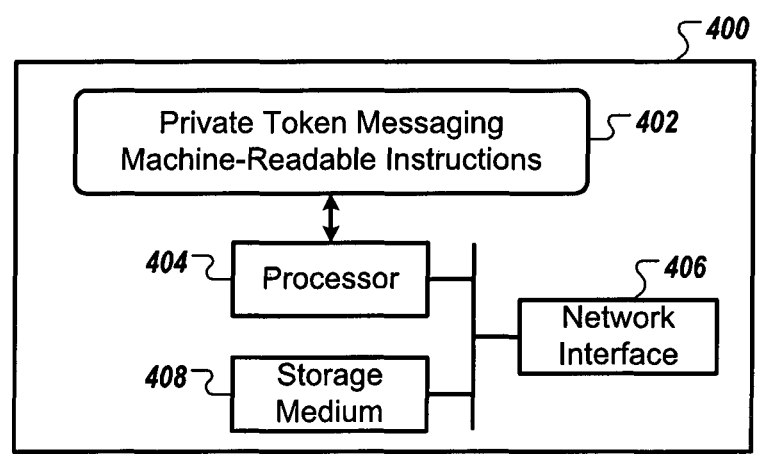
FIG. 4 is a block diagram of an example computer system to perform electronic messaging in accordance with implementations described herein.

FIG. 4 is a block diagram of an example computer system 400 to perform electronic messaging in accordance with implementations described herein. The system 400 includes private token messaging machine-readable instructions 402, which may include or be implemented by certain of the various modules depicted in FIG. 1, and/or which may perform portions or all of the processes described in FIGS. 2 and 3. For example, in some implementations, the machine readable instructions 402 may cause one or more processors to obtain registration information associated with a user who has subscribed to receive electronic messages from a subscription-based messaging service, the registration information including an electronic address of the user and a private token that, is known to the user and to the subscription-based messaging service. The machine-readable instructions 402 may further cause the one or more processors to generate an electronic message associated with the subscription-based messaging service, the electronic message including the private token. The machine-readable instructions 402 may further cause the one or more processors to send the electronic message to the electronic address of the user.

The private token messaging machine-readable instructions 402 may be loaded for execution on a processor or processors 404. As used herein, a processor may include a microprocessor, microcontroller, processor module or subsystem, programmable integrated circuit, programmable gate array, or another control or computing device. The processor(s) 404 may be coupled to a network interface 406 (to allow the system 400 to perform communications over a data network) and/or to a storage medium (or storage media) 408.

The storage medium 408 may be implemented as one or multiple computer-readable or machine-readable storage media. The storage media may include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; optical media such as compact disks (CDs) or digital video disks (DVDs); or other appropriate types of storage devices.

Note that the instructions discussed above may be provided on one computer-readable or machine-readable storage medium, or alternatively, may be provided on multiple computer-readable or machine-readable storage media distributed in a system having plural nodes. Such computer-readable or machine-readable storage medium or media is (are) considered to be part of an article (or article of manufacture). An article or article of manufacture may refer to any appropriate manufactured component or multiple components. The storage medium or media may be located either in the machine running the machine-readable instructions, or located at a remote site, e.g., from, which the machine-readable instructions may be downloaded over a network for execution.

Although a few implementations have been described in detail above, other modifications are possible. For example, the logic flows depicted in, the figures may not require the particular order shown, or sequential order, to achieve desirable results. In addition, other steps may be provided, or steps may be eliminated, from, the described flows. Similarly, other components may be added to, or removed from, the described systems. Accordingly, other implementations are within the scope of the following claims.

What is claimed is:

1. A method comprising:
  registering a user with a subscription-based messaging service, the registering including:
    obtaining, at a computing system, registration information associated with a user who has subscribed to receive electronic messages from the subscription-based messaging service, the registration information including an electronic address of the user and a private token that is known to the user and to the subscription-based messaging service, the private token being selected by the user; and
    analyzing, at the computing system, the private token to determine whether the private token is likely to occur in electronic messages from the subscription-based messaging service, and in response to determining that the private token is likely to occur, notifying the user;
  embedding, using the computing system, the private token in an electronic message associated with the subscription-based messaging service, wherein inclusion of the private token in the electronic message indicates to the user that the electronic message is from a legitimate sender that is associated with the subscription-based messaging service; and
  sending, using the computing system, the electronic message to the electronic address of the user.

2. The method of claim 1, wherein the private token is embedded in the electronic message such that the private token is visible to the user within a body portion or a subject portion of the electronic message.

3. The method of claim 1, wherein the private token is embedded in the electronic message such that the private token is not visible to the user in a body portion or a subject portion of the electronic message.

4. The method of claim 1, wherein the private token includes a textual word, an image, or a combination of a textual word and an image.

5. The method of claim 1, wherein the private token is generated by the subscription-based messaging service and communicated to the user during registration with the subscription-based messaging service.

6. A subscription-based messaging system comprising:
  one or more processors;
  a registration engine that executes on at least one of the one or more processors to obtain registration information associated with a user who has subscribed to receive electronic messages from the subscription-based messaging system, the registration information including an electronic address of the user and a private token that is known to the user and to the subscription-based messaging system, the registration engine analyzing the private token to determine whether the private token is likely to occur in electronic messages from the subscription-based messaging system, and in response to determining that the private token is likely to occur, notifying the user during registration; and
  a messaging engine that executes on at least one of the one or more processors to generate an electronic message addressed to the electronic address of the user, the electronic message including the private token.

7. The subscription-based messaging system of claim 6, wherein inclusion of the private token in the electronic message indicates visually to the user that the, electronic message is from a legitimate sender associated with the subscription-based messaging system.

8. The subscription-based messaging system of claim 6, wherein analyzing the private token comprises comparing the private token to an index of terms associated with messages from the subscription-based messaging system.

9. The subscription-based messaging system of claim 6, wherein analyzing the private token comprises comparing the private token to terms included in prior electronic messages sent from the subscription-based messaging system.

10. The subscription-based messaging system of claim 6, wherein the private token is embedded in the electronic message such that the private token is visible to the user within a body portion or a subject portion of the electronic message.

11. The subscription-based messaging system of claim 6, wherein the private token is embedded in the electronic message such that the private token is not visible to the user in a body portion or a subject portion of the electronic message.

12. The subscription-based messaging system of claim 6, wherein the private token includes a textual word, an image, or a combination of a textual word and an image.

13. A non-transitory computer-readable storage medium storing instructions that, when executed by one or more processors, cause the one or more processors to:
   register a user who has subscribed to receive electronic messages from a subscription-based messaging service, by obtaining registration information associated with the user, the registration information including an electronic address of the user and a private token that is selected by the user;
   analyze the private token to determine whether the private token is likely to occur in electronic messages from the subscription-based messaging system, and in response to determining that the private token is likely to occur, notify the user during the registration of the user with the subscription-based messaging service;
   generate an electronic message associated with the subscription-based messaging service, the electronic message including the private token; and
   send the electronic message to the electronic address of the user.

14. The subscription-based messaging system of claim 6, wherein the registration engine obtains the private token from the user during registration with the subscription-based messaging service.

* * * * *